(12) United States Patent
Roth et al.

(10) Patent No.: US 7,999,823 B2
(45) Date of Patent: Aug. 16, 2011

(54) DEVICE AND METHOD FOR PROJECTION DEVICE BASED SOFT PROOFING

(75) Inventors: Shmuel Roth, Petach Tikva (IL); Oded Ben-David, Rishon (IL); Moshe Ben-Chorin, Rehovot (IL)

(73) Assignee: Samsung Electronics Co., Ltd. (KR)

(*) Notice: Subject to any disclaimer, the term of this patent is extended or adjusted under 35 U.S.C. 154(b) by 761 days.

(21) Appl. No.: 10/500,896

(22) PCT Filed: Jan. 7, 2003

(86) PCT No.: PCT/IL03/00020
§ 371 (c)(1),
(2), (4) Date: Mar. 3, 2005

(87) PCT Pub. No.: WO03/058587
PCT Pub. Date: Jul. 17, 2003

(65) Prior Publication Data
US 2005/0190141 A1    Sep. 1, 2005

Related U.S. Application Data

(60) Provisional application No. 60/344,793, filed on Jan. 7, 2002.

(51) Int. Cl.
*G09G 5/02* (2006.01)
(52) U.S. Cl. .................................. 345/590; 345/589
(58) Field of Classification Search .................. 345/82, 345/84; 353/31, 33
See application file for complete search history.

(56) References Cited

U.S. PATENT DOCUMENTS

| | | |
|---|---|---|
| 3,699,244 A | 10/1972 | Cohen et al. |
| 4,390,893 A | 6/1983 | Russell et al. |
| 4,751,535 A | 6/1988 | Myers |
| 4,800,375 A | 1/1989 | Silverstein et al. |
| 4,843,381 A | 6/1989 | Baron |
| 4,843,573 A | 6/1989 | Taylor et al. |
| 4,892,391 A | 1/1990 | Stewart et al. |
| 4,952,972 A | 8/1990 | Someya |
| 4,985,853 A | 1/1991 | Taylor et al. |
| 4,994,901 A | 2/1991 | Parulski et al. |

(Continued)

FOREIGN PATENT DOCUMENTS

| EP | 367848 | 5/1990 |
|---|---|---|

(Continued)

OTHER PUBLICATIONS

Supplementary European Search Report for EP 02 73 3203 dated Sep. 26, 2005.

(Continued)

*Primary Examiner* — Kee M Tung
*Assistant Examiner* — Jacinta Crawford
(74) *Attorney, Agent, or Firm* — Innovation Counsel LLP

(57) ABSTRACT

A display (36) for reproducing an image intended for printing on a substrate using a set of inks, the image having a perceived color gamut when print it on the substrate, the display (36) including a light source (38) generating a set of at least three primary color (RGB), and a controller (42) combining the set of at least three primary color to substantially reproduce the image, wherein the at least three primary color define a viewed color gamut which substantially covers the perceived color gamut.

25 Claims, 10 Drawing Sheets

U.S. PATENT DOCUMENTS

| | | | |
|---|---|---|---|
| 5,087,610 | A | 2/1992 | Hed |
| 5,184,114 | A | 2/1993 | Brown |
| 5,191,450 | A | 3/1993 | Yajima et al. |
| 5,233,183 | A | 8/1993 | Field |
| 5,233,385 | A | 8/1993 | Sampsell |
| 5,243,414 | A | 9/1993 | Dalrymple et al. |
| 5,416,890 | A | 5/1995 | Beretta |
| 5,447,811 | A | 9/1995 | Buhr et al. |
| 5,455,600 | A | 10/1995 | Friedman et al. |
| 5,563,621 | A | 10/1996 | Silsby |
| 5,592,188 | A | 1/1997 | Doherty et al. |
| 5,614,925 | A | 3/1997 | Braudaway et al. |
| 5,631,734 | A | 5/1997 | Stern et al. |
| 5,650,942 | A | 7/1997 | Granger |
| 5,657,036 | A | 8/1997 | Markandey et al. |
| 5,724,062 | A | 3/1998 | Hunter |
| 5,736,754 | A | 4/1998 | Shi et al. |
| 5,740,334 | A | 4/1998 | Lin et al. |
| 5,744,795 | A * | 4/1998 | Bianchi et al. ............... 250/234 |
| 5,751,385 | A | 5/1998 | Heinze |
| 5,835,099 | A | 11/1998 | Marimont |
| 5,841,494 | A | 11/1998 | Hall |
| 5,844,699 | A | 12/1998 | Usami et al. |
| 5,863,125 | A | 1/1999 | Doany |
| 5,870,530 | A | 2/1999 | Balasubramanian |
| 5,872,898 | A | 2/1999 | Mahy |
| 5,892,891 | A | 4/1999 | Dalal et al. |
| 5,909,227 | A | 6/1999 | Silverbrook |
| 5,982,541 | A | 11/1999 | Li et al. |
| 5,999,153 | A | 12/1999 | Lind et al. |
| 6,018,237 | A | 1/2000 | Havel |
| 6,058,207 | A | 5/2000 | Tuijn et al. |
| 6,069,601 | A * | 5/2000 | Lind et al. ............... 345/88 |
| 6,072,464 | A | 6/2000 | Ozeki |
| 6,097,367 | A | 8/2000 | Kuriwaki et al. |
| 6,144,420 | A | 11/2000 | Jung |
| 6,147,720 | A | 11/2000 | Guerinot et al. |
| 6,191,826 | B1 | 2/2001 | Murakami et al. |
| 6,198,512 | B1 | 3/2001 | Harris |
| 6,220,710 | B1 | 4/2001 | Raj et al. |
| 6,231,190 | B1 | 5/2001 | Dewald |
| 6,236,406 | B1 | 5/2001 | Li |
| 6,246,396 | B1 | 6/2001 | Gibson et al. |
| 6,256,073 | B1 | 7/2001 | Pettitt |
| 6,259,430 | B1 | 7/2001 | Riddle et al. |
| 6,262,710 | B1 | 7/2001 | Smith |
| 6,262,744 | B1 | 7/2001 | Carrein |
| 6,280,034 | B1 | 8/2001 | Brennesholtz |
| 6,304,237 | B1 * | 10/2001 | Karakawa ............... 345/84 |
| 6,324,006 | B1 | 11/2001 | Morgan |
| 6,366,291 | B1 | 4/2002 | Taniguchi et al. |
| 6,380,961 | B1 | 4/2002 | Van Der Loop et al. |
| 6,407,766 | B1 | 6/2002 | Ramanujan et al. |
| 6,456,301 | B1 | 9/2002 | Huang |
| 6,459,425 | B1 | 10/2002 | Holub et al. |
| 6,467,910 | B1 | 10/2002 | Sato |
| 6,522,338 | B1 * | 2/2003 | Takagi ............... 345/600 |
| 6,538,742 | B1 | 3/2003 | Ohsawa |
| 6,570,584 | B1 | 5/2003 | Cok et al. |
| 6,580,482 | B1 | 6/2003 | Hiji et al. |
| 6,594,387 | B1 | 7/2003 | Pettitt et al. |
| 6,633,302 | B1 | 10/2003 | Ohsawa et al. |
| 6,750,992 | B1 | 6/2004 | Holub |
| 6,870,523 | B1 * | 3/2005 | Ben-David et al. ............ 345/84 |
| 6,972,736 | B1 * | 12/2005 | Wada et al. ............... 345/32 |
| 2002/0005829 | A1 | 1/2002 | Ouchi |
| 2002/0122019 | A1 * | 9/2002 | Baba et al. ............... 345/88 |
| 2002/0149546 | A1 | 10/2002 | Ben-Chorin et al. |
| 2002/0167528 | A1 * | 11/2002 | Edge ............... 345/600 |

FOREIGN PATENT DOCUMENTS

| | | |
|---|---|---|
| EP | 0547603 | 6/1993 |
| EP | 0653879 | 5/1995 |
| JP | 60 263122 | 12/1985 |
| JP | 07043658 | 2/1995 |
| JP | 8-248410 | 9/1996 |
| JP | 251160 | 9/1997 |
| JP | 09251160 | 9/1997 |
| JP | 10 307205 | 11/1998 |
| JP | 10-307205 | 11/1998 |
| JP | 2000253263 | 9/2000 |
| JP | 2000338950 | 12/2000 |
| WO | WO 95/10160 | 4/1995 |
| WO | WO 97/35424 | 9/1997 |
| WO | WO 97/42770 | 11/1997 |
| WO | WO 01/95544 | 12/2001 |
| WO | WO 02/50763 | 6/2002 |

OTHER PUBLICATIONS

Supplementary European Search Report for EP 03 70 6857 dated Sep. 20, 2006.

International Search Report for Application No. PCT/IL03/00020, dated Jul. 2, 2003.

U.S. Appl. No. 09/710,895, filed Nov. 14, 2000, Ben-David et al.

Wyble & Berns, "A Critical View of Spectral Models Applied to Binary Color Printing", vol. 25, 2000, pp. 4-19.

Jeffrey A. Shimizu, "Scrolling Color LCOS for HDTV Rear Projection," SID 01 Digest, pp. 1072-1075, Jun. 2001.

Francisco H. Imai, Color Science; "Spectral reproduction from scene to hardcopy", Part 1—Multi-spectral acquisition and spectral estimation using a Trichromatic Digital Camera System associated with absorption filters, 2001.

Rosen et al, "Spectral Reproduction from Scene to Hardcopy II: Image Processing". Munsell Color Science Laboratory, RIT—Proceedings of SPIE vol. 4300(2001), pp. 33-41, 2001.

Pointer, M.R., "The Gamut of Real Surface Colours", Color Research & Appl. 5(3):145-155, 1980.

Gunter Wyszecki & W.S. Stiles, Color Science; Concepts and Methods, Quantitative Data and Formulae, 2d. Ed., 1982, pp. 179-183.

Ajito et al, "Expanded Color Gamut Reproduced by Six-Primary Projection Display", Proc. SPIE, vol. 2954 (2000) pp. 130-137.

Ajito et al, "Multiprimary Color Display for Liquid Crystal Display Projectors Using Diffraction Granting", Optical Eng.38(11) 1883-1888 (Nov. 1999).

Ajito et al, "Color Conversation Method for Multiprimary Display Using Matrix Switching", Optical Review, vol. 9, No. 3, Dec. 2001, 191-197.

Mashairo Yamaguchi, Taishi Teraji, Kenro Ohsawa, Toshio Uchiyama, Hideto Motomuro, Yuri Murakami and Nagaaki Ohyama "Color Image reproduction based on the multispectral and multiprimary imaging: Experimental evaluation", Device Independent Color, Color Hardcopy and applications VII, Proc SPIE, vol. 4663, pp. 15-26 (2002).

Ken-ichi Takatori, Hiroshi Imai, Hideki Asada and Masao Imai "Field-Sequential Smectic LCD with TFT Pixel Amplifier", Functional Devices Research Labs, NEC Corp., Kawasaki, Kanagawa 216-8555, Japan, SID 01 Digest, 2001.

* cited by examiner

Solid Circles: inks and overlaps CMYRGB
Empty Circles: Display primaries

DEVICE AND METHOD FOR PROJECTION DEVICE BASED SOFT PROOFING

CROSS-REFERENCE TO RELATED APPLICATIONS

This application is a National Phase Application of PCT International Application No. PCT/IL03/00020, International Filing Date Jan. 7, 2003, claiming priority of U.S. Provisional Patent Application, 60/344,793, filed Jan. 7, 2002.

FIELD OF THE INVENTION

An embodiment of the present invention relates to a device, system and a method of electronic display for digital soft proofing of printed matter.

BACKGROUND OF THE INVENTION

Reproduction of color involves the creation of an accurate apparent color match between original and reproduction. Color originals may be, for example, pictorial slides, which are analog in nature and have a very wide color gamut, wider than in typical reproduction, such as offset printing. In the age of digital information most of the reproduction process is performed digitally. The original slide is scanned to obtain a file containing the color data in terms of RGB values. The file is then converted to CMYK separations, and afterwards plates are created and installed on a press for print. To obtain color consistency, proofs are performed and examined in various stages of the process to ensure that each step is color-consistent with its previous step.

Accurate reproduction of color is very important for printed matter. Typically, in order to achieve an accurate color match, a "hard proof" may be printed on paper and sent to the customer and/or designer for approval. Upon approval, the proof is delivered to the printing shop, where the printer working on the press machine adjusts the press machine until the printed sheets match the hard proof.

For certain applications, most notably in the packaging industry, there is a need for special colors, many of which are out of the gamut of CMYK process inks. Therefore, standard CMYK hard proofers are unsuitable for such proofing.

The manual procedure of proofing limits the advantages of digital workflow. The need for an accurate digital "soft proof" on an electronic display is clear. Currently available "soft proofing" devices are intended to enable designers and pre-press personnel to view works on a display of a computational device such as a personal computer or workstation. Such devices may be based on Cathode Ray Tubes (CRT) or Liquid Crystal Devices (LCD). The final product, however, is an image printed on paper. Currently, soft proofing devices do not overcome inherent deficiencies of digital print proofing, and in particular do not provide good color match, in the sense that they cannot accurately replicate the colors electronically as they would appear on the printed material. This is a serious drawback, as many printed works are now transferred digitally from design to printed material over a network, and any intermediate procedure that must involve printing onto a physical substrate, prior to the final printing step, significantly reduces the efficiency of the printing process.

It should be noted that, for various reasons, CRT color displays generally do not provide an accurate color match to a printed image. As shown in FIG. 1, the color gamut reproduced by a printing press, e.g., an offset printer, is different from that of CRT displays, e.g., there are non-overlapping regions in the printed gamut relative to the CRT gamut and vice versa. Thus, the colors that can be displayed by a CRT monitor do not overlap the colors that can be produced by printing methods. For example, FIG. 1 illustrates the color gamut of offset printing under D50 daylight illumination as compared with the color gamut that can be displayed on a typical CRT monitor. The CRT monitor cannot reproduce the yellow colors, e.g., in a vicinity of color coordinates (x=0.45, y=0.45), nor can the CRT monitor reproduce a wide cyan-green spectrum, e.g., in a region between color coordinates (x=0.2,y=0.2) and (x=0.3,y=0.5). It is evident that a CRT monitor cannot reproduce certain printing colors that have color coordinates outside the CRT gamut. At least part of the limitation of the CRT gamut is associated with the physical properties of the CRT screen, e.g., the emitted spectrum from the red, green and blue phosphors of the CRT. Furthermore, in many cases printers use special colors (e.g., Coca-Cola Red or other trade mark colors like Pantone, Toyo BS, etc.), many of which are outside the gamut of the CRT and the offset CMYK process inks. These colors cannot be matched by CRT monitors, nor can they be matched by a "hard" proofer designed to match process CMYK inks.

A further problem with soft proofing on CRT monitors is that the colors of the inks (and color combinations of such inks) are different from those reproduced by the RGB phosphors of CRT monitors, and therefore a special transformation from CMYK values to corresponding ROB values may be required in order to reach colors closer to an apparent calorimetric match. Such transformation is the basis of existing methods of color matching in general, and soft proofing on display methods in particular. Such methods are based on mapping of the color space of an output device (e.g., printing press, display) onto a device-independent color space, such as L*a*b*, as defined by Commission Iternationale De L'éclairage (CIE). Using this mapping, a multi-dimensional transformation from the RGB space of the display into the L*a*b* space may be performed. Then, another transformation from the L*a*b* space onto the CMYK space of the printing press may be performed. These transformations, known as profiles, are performed on the data file containing the work, before printing, by a color management system. The International Color Consortium (ICC) has standardized this method for color matching.

It is noted that the profiling process described above maps the colors created by CMYK inks printed on a certain substrate and viewed under certain light conditions onto a color space of the RGB phosphors. The spectra of the light reflected off the CMYK inks depends on the lighting conditions, e.g., the spectrum of white light which illuminates the paper of the printed material, and on the reflectivity of the paper. Therefore, different profiles may be required for each combination of paper type and/or ink type and/or illumination conditions, resulting in a cumbersome profiling process.

Furthermore, CRT monitors may not have adequate color consistency and stability, for a number of reasons. First, the electronic circuitry that drives the electron beam is not sufficiently stable, resulting in changes in the brightness of the light emitted from the phosphors. Furthermore, the ratio between the brightness of the Red, Green and Blue (RGB) light may also change, resulting in color variations for a given RGB input value. CRT displays are also highly influenced by external conditions such as magnetic fields. The presence of even slightly magnetized materials near a CRT monitor (such as a loudspeaker, motor, etc) will cause color shifts that are beyond the acceptable level in proofing applications. Thus, a CRT for proofing applications should be used in a highly controllable environment. This dictates the use of specially calibrated and electronically stabilized monitors, such as the Reference and Personal Calibrator™, available from Barco, Kortrijk, Belgium. Furthermore, the exchangeability of CRT monitors is very limited, because the phosphors have tolerances in their emission spectra, resulting in different colors for different CRT units. In addition the phosphors decay and fade over time. All these phenomena require continuing calibration and profiling of the CRT itself.

Moreover, even if the CRTs could be made more stable, they are typically unsuitable for color reproduction. Color accuracy is highly dependent on ambient light conditions. Small amounts of ambient light, reflected from the CRT screen, are added to the light originating from the phosphors, altering the overall appearance of the displayed picture. This effect is very pronounced when viewing relatively dark colors, but even brighter colors are vulnerable to this effect. Since the brightness of the CRT used as computer monitors is typically relatively low, the level of ambient light in a normal working environment is sufficiently high to cause unacceptable color shifts. Thus, the use of CRT for proofing purposes dictates the use of a controlled environment, e.g. a relatively dark room. Further, the high reflectance of "shadow mask" technologies used by many CRT monitors exasperates the color variation problems of existing displays.

The match between images depends also on their level of brightness. As discussed above, the brightness of normal CRT used as computer monitors is relatively low. Enhancement of the brightness of CRT based computer monitors is limited, because the emission of the light from the phosphors is associated with a harmful X-ray radiation created by the deceleration of electrons impinging on the screen. In proofing applications, however, hard prints are typically viewed under a much higher light intensity to maximize image brightness. To compensate for this difference in lighting conditions requirement, attempts have been made to account for different levels of illumination of the print and the CRT, by including perceptual models in the mathematical transformation of the CMYK data to the RGB input. Unfortunately, no such transformation has produced satisfactory results, partly because the transformation correction depends on human perception, which does not have an established mathematical model. Therefore, it is practically impossible to compare a printed sample to a soft proof viewed on a CRT under the same ambient illumination level.

As described above, the RGB spectra reproduced by CRT phosphors is very different from that of color inks and their overlaps. Moreover, in viewing the subtractive color combinations produced by color inks, the number of elementary colors integrated by the eye is larger than that of the standard RGB system. Certain colorimetric match to "in-gamut" colors, as described above, may be possible; however, even if good colorimetric match between print and monitor may be achieved for one observer, such a match is not guaranteed for another observer. This is due to the fact that color is a psychophysical phenomenon, which involves the spectral input to the eye, the optics of the eye, and a perceptual process. Different individuals are likely to differ in their color perception, due to variations in the eye physiology. The significant spectral discrepancy between the CRT phosphors and the printed ink elementary colors often results in situations where a match between CRT and print may be reasonable for one observer, but not acceptable for another observer. Due to this and other deficiencies, a CRT monitor cannot be used as an accurate device for color communication.

Many attempts have been made in the past to adapt CRT displays for soft proofing using calibrated monitors and ICC profiling, e.g., Apple ColorSync™ from Apple Computer Inc., CA, USA, Barco Calibrator™ from Barco, Kortrijk, Belgium, Virtual Matchprint™ from Kodak Polychrome Graphics (KPG), etc. However, CRT based soft proofing has not gained sufficient ground in the industry, mainly due to the deficiencies discussed above.

Other display technologies, e.g., LCD displays of laptop and desktop computers, suffer from some of the problems discussed above, in varying degrees. Furthermore, the color gamut of most flat-panel LCD displays is smaller than that of CRT and, therefore, such displays cover even a smaller fraction of the printed color compared to CRT displays. Additionally, LCD displays have a high variation of color and brightness as a function of viewing angle, whereby a slight change in the viewing angle of the observer may result in significant changes in color.

SUMMARY OF THE INVENTION

Embodiments of the present invention provide devices, systems and methods of electronic color display that enable accurate soft proofing of images under normal ambient lighting conditions.

Embodiments of one aspect of the present invention provide a display for reproducing an image intended for printing on a substrate using a set of inks, the image having a perceived color gamut when printed on the substrate, the display including a light source generating a set of at least three primary colors, and a controller combining the set of at least three primary colors to substantially reproduce the image, wherein the at least three primary colors define a viewed color gamut which substantially covers the perceived color gamut.

Embodiments of another aspect of the present invention provide a method for reproducing an image intended for printing on a substrate using a set of inks, the image having a perceived color gamut when printed on the substrate, the method including accepting data corresponding to the image, converting the data to data corresponding to a set of at least three primary colors, selectively producing light of the at least three primary colors, and combining the at least three primary colors to substantially reproduce the image, wherein the at least three primary colors define a viewed color gamut which substantially covers the perceived color gamut.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description read in conjunction with the accompanying drawings, in which:

Figure 1:
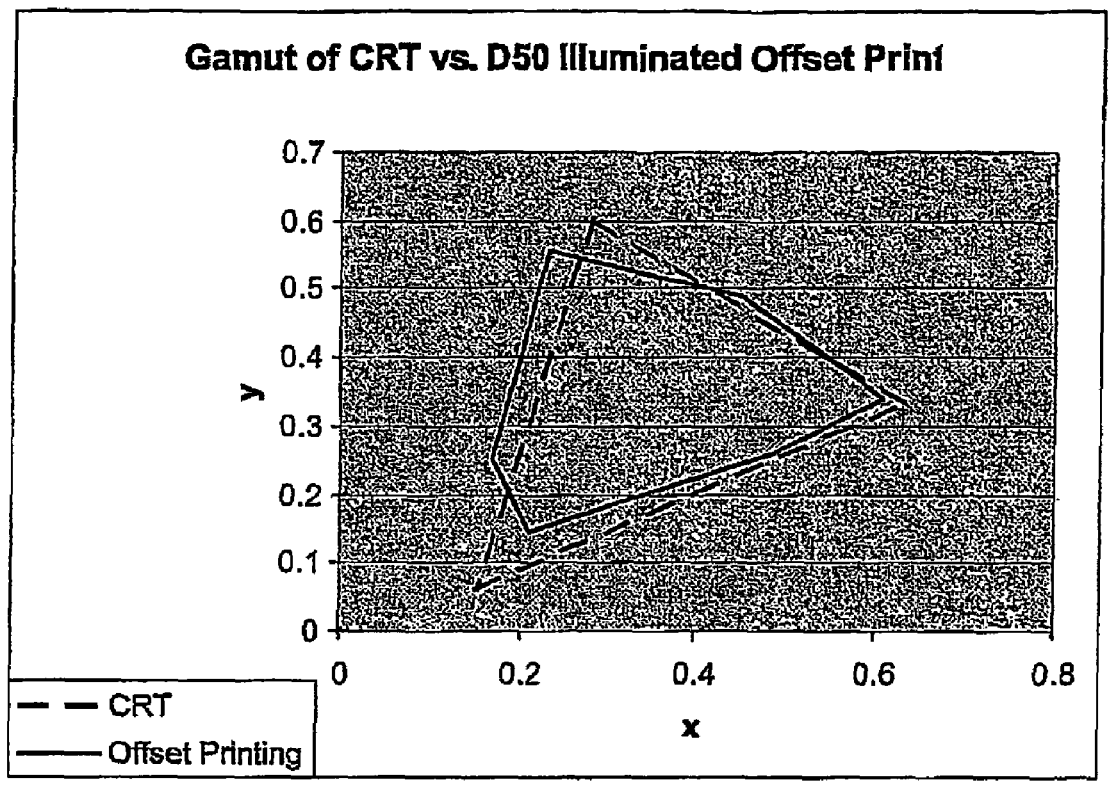
FIG. 1 is a schematic illustration of a comparison between a typical offset printing color gamut and a typical color gamut of a prior art CRT display.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS THE INVENTION

Various aspects of the present invention are described herein. For purposes of explanation, specific configurations and details are set forth in order to provide a thorough understanding of the present invention. However, it will also be apparent to one skilled in the art that the present invention may be practiced without the specific details presented herein. Furthermore, certain well-known details or features may have been omitted or simplified in order not to obscure the present invention.

A monitor for print proofing in accordance with embodiments of the invention may be constructed, for example, as described in International Patent Application PCT/IL01/01179, entitled "SPECTRALLY MATCHED PRINT PROOFER"; filed Dec. 18, 2001, and published Jun. 27, 2002, as WO 02/50763, the entire disclosure of which is incorporated herein by reference. While methods and systems disclosed in this patent application are used in embodiments of the present invention, for example, methods to convert source data to primary data, or methods of creating primary colors, e.g., filters, it will be appreciated that, in alternate embodiments, the system and method of the present invention may be used with other types of display technology.

According to one embodiment, the invention includes a projection display using three primary colors. It will be apparent to those skilled in the art that a triangular color gamut produced by the three-primary device of the invention contains the gamut of typical CMYK process inks. As described in detail below, the display may include a low-reflection viewing screen. The display of the invention may further include a set of filters that may be used to reproduce various illumination conditions. Further, the display may include a set of filters that may be used to reproduce various reflectance properties of the print substrate. Additionally or alternatively, the display may include color management tools and software to obtain a desired color match relative to a printed substrate.

The display of the invention may include a color calibration system and may be combined or used in conjunction with a light box.

Embodiments of the present invention include a system and method for soft proofing using a non-CRT projection type monitor. The projection type monitor may be based on a polychromatic light source, such as, for example, a high pressure Mercury lamp, Xenon lamp, or any other suitable type of light source, which illuminates a spatial light modulator (SLM), for example, a DLP type SLM. Color may be achieved via filters are placed in the optical path of the polychromatic light to create different primary color patterns. The different color patterns may be separated spatially or temporally, and the full color sensation is obtained by spatial or temporal integration of the separate patterns by the eye of a viewer. Other types of lamps or modulators may be used in alternate embodiments of the invention.

Figure 2A:
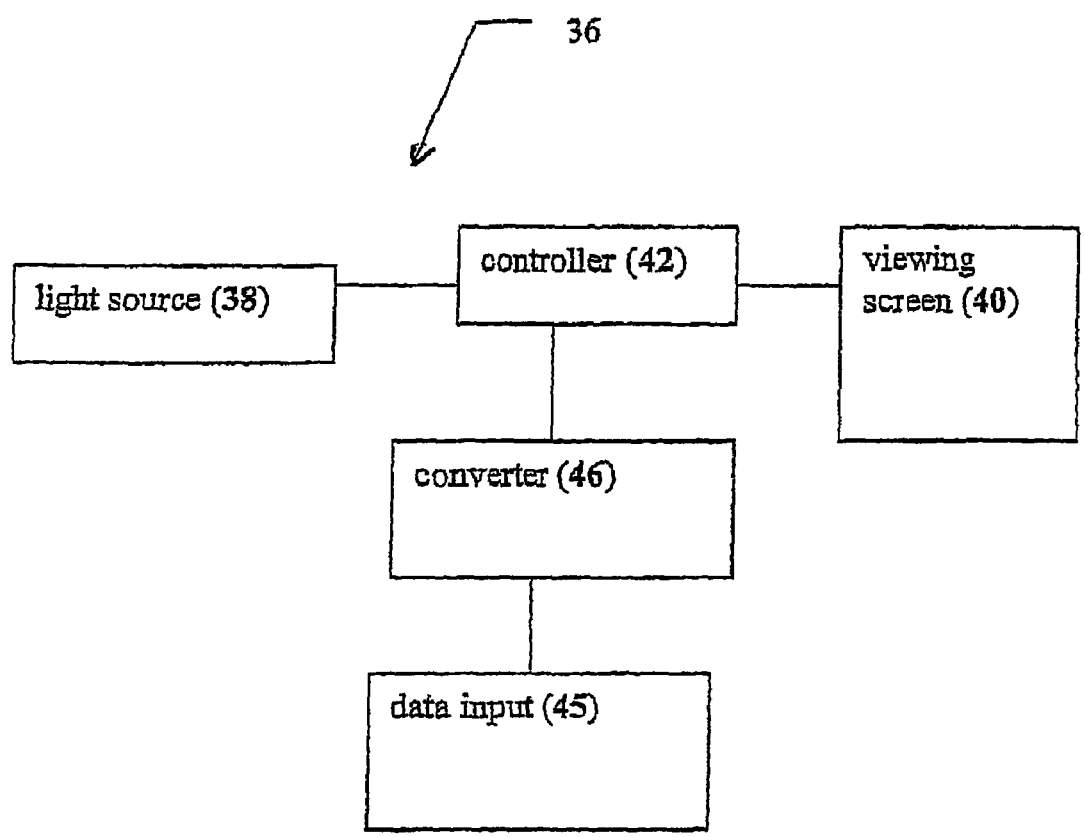
FIGS. 2A and 2B are schematic block diagrams of embodiments of an exemplary display device and system according to an embodiment of the present invention.
Figure 2B:
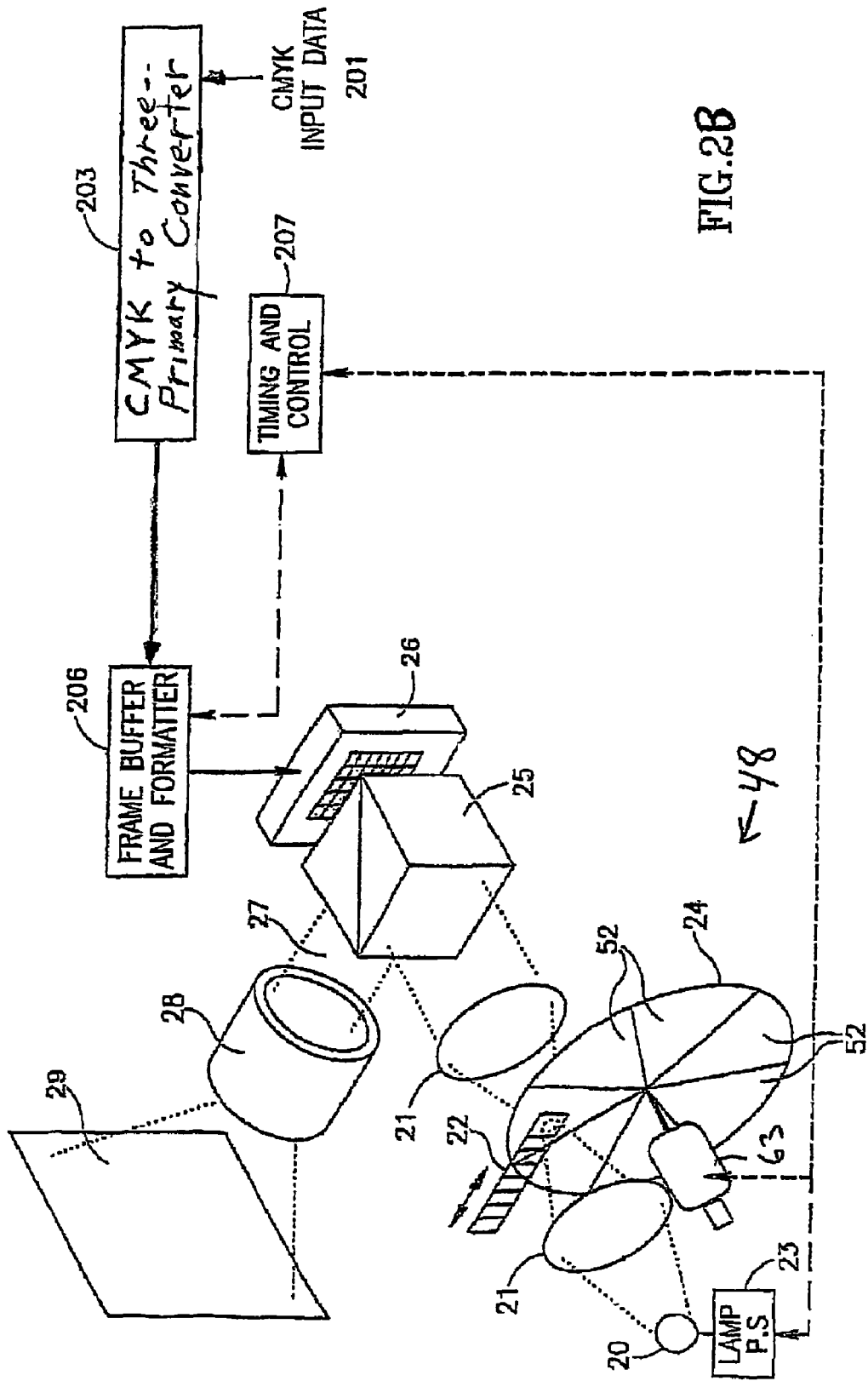

Referring now to the drawings, FIGS. 2A and 2B are schematic block diagrams of embodiments of an exemplary display device and system for electronic soft proofing according to an embodiment of the present invention. FIG. 2A shows a basic embodiment of the exemplary display device and system, while FIG. 2B shows an embodiment featuring a light projection mechanism.

As shown in FIG. 2A, a system 36 according to one embodiment features a light source 38 for producing light of at least three primary colors. In one embodiment, these colors include specific selections of RGB primary colors, as described in detail below, which results in a color gamut that contains substantially the entire gamut of process inks printed on a substrate. The gamut of process inks is defined by its elementary colors, i.e., the cyan magenta and yellow inks, and the overlap between the inks, namely, red (overlap of magenta and yellow), green (overlap of cyan and yellow) and blue (overlap of cyan and magenta), as viewed on the printed substrate under certain illumination conditions. The elementary colors, e.g., cyan, magenta, yellow, red, green and blue, determine the boundaries of the perceived gamut obtained by a printing process. The primaries of the display in accordance with embodiments of the invention are chosen to cover the printed gamut or even, in some embodiments, a wider gamut. In one embodiment, one filter or primary source may be used for each elementary color; in alternate embodiments lower numbers of primaries may be mixed in the proper proportions to reproduce with acceptable accuracy a higher number of elementary colors. The light from light source 38 is displayed on a viewing screen 40, thereby enabling the human viewer to see the colors of the displayed image (not shown). Preferably, the light from light source 38 is projected onto viewing screen 40. In order for each color to be properly displayed in the correct location of the displayed image, a controller 42 controls the production of light of each color, such that the correct light is shown at the correct location of viewing screen 40. Controller 42 may be separate from light source 38, such that these two components are not combined into a single component. In alternate embodiments of the invention, the two components may be provided in the same device.

Although not shown or described herein, in alternate embodiments of the system and method of the present invention, the specific primary colors defined below may be produced by other methods, such as by LCDs or LEDs.

Various physical print systems may be used to convert print data such as digital CMYK print data to printed material. For example, data may be converted by printers using silkscreen methods, lithography, ink jet methods, or other methods. Each method may result in a different appearance for identical input data. The system and method of the present invention may simulate various print methods. In one embodiment, the same display may be used to simulate different printing methods. A user selectable setting may control various aspects of the display, such as filter settings or software or hardware controls, such as data conversion or spectral correction or combination methods, to allow different print processes to be simulated.

In one embodiment of system 36, light source 38 projects light of at least three colors, without being able to control the location of the projected light onto viewing screen 40. Controller 42 then determines the relative location of light of each color as projected onto viewing screen 40, for example with a spatial light modulator and/or another system of mirrors and/or lenses.

In order for controller 42 to be able to determine the correct light for being displayed at each portion of viewing screen 40, controller 42 optionally receives data from a data input 45, which may optionally be digital or analog. Most preferably, controller 42 also receives instructions and/or commands from a converter 46, which is functionally connected between data input 45 and controller 42. Converter 46 converts the data from data input 45 into a format suitable for controller 42, and also includes any necessary instructions and/or commands for enabling controller 42 to be able to understand the data. Converter 46 may be implemented in software, hardware, or any suitable combination of software and/or hardware. Optionally, converter 46 may also convert the data from an analog signal to digital data, such that controller 42 is only required to receive digital data. Converter 46 may be able to determine the appropriate combination of light of at least three different primary colors in order to accurately represent the color image data with displayed colors which match or substantially match the colors of a certain printed material, such that the appearance of the displayed image matches or substantially matches the appearance of a certain set of inks as printed onto the paper of the printed material.

In alternate embodiments, converter 46 is able to determine the appropriate combination of light of another number of primary colors in order to accurately represent a set of elementary colors (e.g., cyan, magenta, yellow, red, green, blue) and the "white" color of the substrate. For example, three or four primaries may be combined to reproduce these seven colors. In other embodiments, a different number of elementary colors may be reproduced, for example, if proofing is desired for an ink system that produces a different number of elementary colors. The match may be based on spectral resemblance, in the sense that the primary filters may be chosen so that the reflection spectra of the elementary color inks, their overlaps, and the substrate, may be reproduced. For example, three or four primaries may be combined to reproduce the seven spectra of the inks, their overlaps and the substrate.

FIG. 2B shows an embodiment of an exemplary display device according to an embodiment of the present invention, which is based on a sequential light projection system, similar in certain respects to that suggested in U.S. Pat. No. 5,592,188, which is hereby incorporated by reference as if fully set forth herein. Embodiments of the present invention use a set of primaries whose colors span a gamut sufficiently wide to contain the entire gamut of colors produced by light reflected off printing inks, and/or overlaps of inks, and substrates of a given printing process. Embodiments of the present invention may use a set of primaries whose spectra are able to substantially reproduce the transmission spectra produced by light reflected off printing inks, and/or overlaps of inks, used in a given printing process. One embodiment may use primary colors of spectra similar to the transmission spectra reflected off printing inks, and/or overlaps of inks, to accurately display the image which is to be printed onto a "hard copy" of printed material, such as, for example, paper. Other embodiments may use combinations of primaries to reproduce such transmission spectra.

A system 48 according to one embodiment of the invention is based on passing white or substantially white light from a source 20 through a spectrum-correcting filter 22 in order to attempt to match the spectrum of the light to at least one of, and more preferably both of, the relevant required illumination conditions and the relevant paper, or other printing substrate, reflectance spectrum, as described in detail below. Spectrum-correcting filter 22 may optionally include two functional components: a first functional component for correcting the spectrum of light with regard to the required illumination conditions; and a second functional component for correcting the spectrum of light with regard to the relevant printing substrate reflectance spectrum. These two functional components are optionally implemented as two separate parts of spectrum-correcting filter 22, but alternatively may be implemented in a single physical device, e.g., in a single set of filters whose transmission spectra account for both types of correction, as described below.

Such correction filters may be implemented in various manners. For example, a filter or set of filters including correcting for several different spectra may be included. A filter wheel or filter bar with such filters may be included, and a user may adjust which filter, if any, may provide correction. In one embodiment, the printing substrate correction filter is a continuously variable filter and the illumination correction filter includes discrete filters. In other embodiments, no such correction is needed, and other types and combinations of correction or adjustment may be used.

The brightness of the light is optionally and preferably controlled by adjusting the amount of power supplied by a power supply 23 or by a variable neutral density filter (not shown) or by a variable size mechanical iris in the illumination path (not shown). The spectrally corrected light passes through appropriate color filters 52 to form colored light of a defined spectral range. As previously described, system 48 may use at least three such colored filters 52, e.g., three primary colors, and a "white" neutral density filter, which as shown may optionally be configured in a color filter wheel 24, but may optionally include other numbers of filters or primary colors.

In further embodiments, primaries are reproduced using methods other than filters; for example, different LEDs may provide primaries.

In order for the light to be directed through the appropriate filter 52, preferably the light is focused by a condenser lens 21, optionally implemented as two such lenses 21 for the purposes of illustration only and without any intention of being limiting. In alternate embodiments, various components, such as the condenser, may be eliminated. The focused light is then directed through one of the filters on filter wheel 24, which holds the color filters 52. In this example, the combination of light source 20, spectrum-correcting filter 22 and color filters 52 can be considered to form at least part of the light source of FIG. 2A above, optionally with other components involved in the production of the light itself.

Preferably, the colored light illuminates a spatially modulated mask 26, also known as a Spatial Light Modulator (SLM) which determines the particular color to be displayed at each portion of the image, typically according to each pixel, by determining whether light of that color is permitted to pass for illuminating that pixel. For example, a digital micromirror device (DMD) such as, for example, that available from Texas Instruments, or a Ferroelectric Liquid Crystal (FLC) SLM such as, for example, that available from Displaytech, or any other suitable SLM device as is known in the art, may be used.

The colored light for this image may then be projected by a projection lens 28 onto a viewing screen 29. Viewing screen 29 displays the resultant colored image to the user (not shown). Spatially modulated mask 26, and preferably the combination of spatially modulated mask 26 and projection lens 28, can be considered to be an example of the controller from FIG. 2A. In alternate embodiments other controllers and methods for controlling the system may be used.

A motor 63 may rotate filter wheel 24 in the path of light emanating from light source 20, so in each turn spatially modulated mask 26 is illuminated sequentially by the colors in filter wheel 24. The rate of rotation may be at the frame frequency, which is the frequency at which the full-color image is refreshed on viewing screen 29.

Preferably, the loading of the data into spatially modulated mask 26 is synchronized by a timing system 207, according to the rotation of filter wheel 24. The light beam is spatially modulated by spatially modulated mask 26, so that the apparent brightness of each primary color varies at different portions of viewing screen 29, typically according to each pixel of the image. Each position on viewing screen 29 may be associated with a certain pixel of spatially modulated mask 26. The brightness of that position is determined by the relevant pixel data in the image. The values for the pixels of the image are optionally retrieved from an image data file 201. In accordance with embodiments of the present invention, the image data values are converted by a converter 203 into a signal representing the data in a three-primary-color format, e.g., a RGB format, corresponding to the primary colors as defined and described herein. The converted three-primary-color data may then be collected by a Frame Buffer and Formatter 206, which may rearrange the data and/or adjust physical parameters of the signal into a format suitable for controlling SLM 26 or any other device that may be used to control the reproduced image.

In accordance with embodiments of the invention, the human viewer temporally integrates the sequential stream of the primary images to obtain a color image, which spectrally matches or substantially spectrally matches the image on paper. In further embodiments, other methods of producing primaries and displaying primaries may be used, and other light delivery mechanisms using different sets of components may be used. For example, an SLM need not necessarily be used.

Exemplary implementations of various components of the above projection display system are now given in greater detail. Spectrum-correcting filter 22 may correct for at least one of, and preferably both of, the required illumination conditions and the relevant paper or printing substrate reflectance spectrum. One standard illumination in the printing industry is D50 illuminant, or D65 in United States, representing daylight illumination from a black body at 5000° K and 6500° K, respectively, through the atmosphere. Other illuminants, such as illuminant A, tungsten lamp, typical for indoor illumination, and 9300° K illumination, typical for light outdoors under a blue sky without direct sunlight, are also common. The lamp itself has a spectrum, which is typically, but which may not be, very different from these illuminants and may depends on the type of the lamp, e.g. tungsten, halogen, metal-halide, Xenon and others. Therefore, the spectrum of the emitted light may be corrected.

The illumination correction is preferably obtained by placing spectrum-correcting filter 22 with a transmission spectrum $T_f(\lambda)$ after light source 20. The filter spectrum is given by $T_f(\lambda)$? $S_i(\lambda)/S_L(\lambda)$, where $S_L(\lambda)$ and $S_i(\lambda)$ are light source 20 and the required illuminant spectra respectively. The light passing through spectrum correcting filter 22 has a spectrum preferably identical or substantially identical to that of the required illuminant. These types of filters are based on color temperature conversion filters in combination with narrow notch filters, which are applied if the lamp spectrum contains narrow spectral lines, which may be rejected. The design of such filters is known in the art.

Figure 4A:
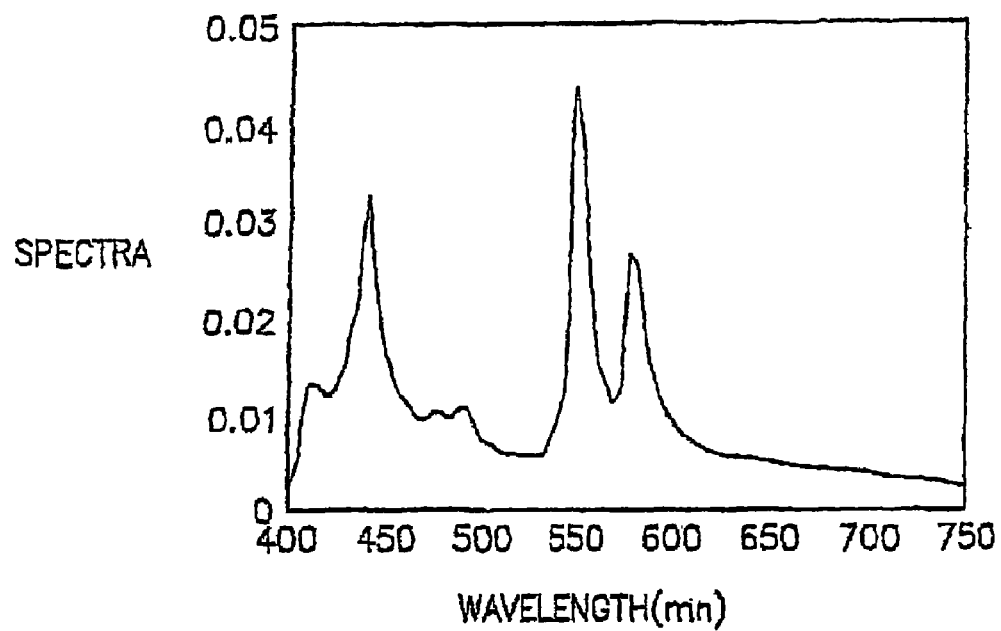
FIG. 4A is a schematic illustration of the spectra of a lamp currently marketed as the Osram™ VIP lamp.
Figure 4B:
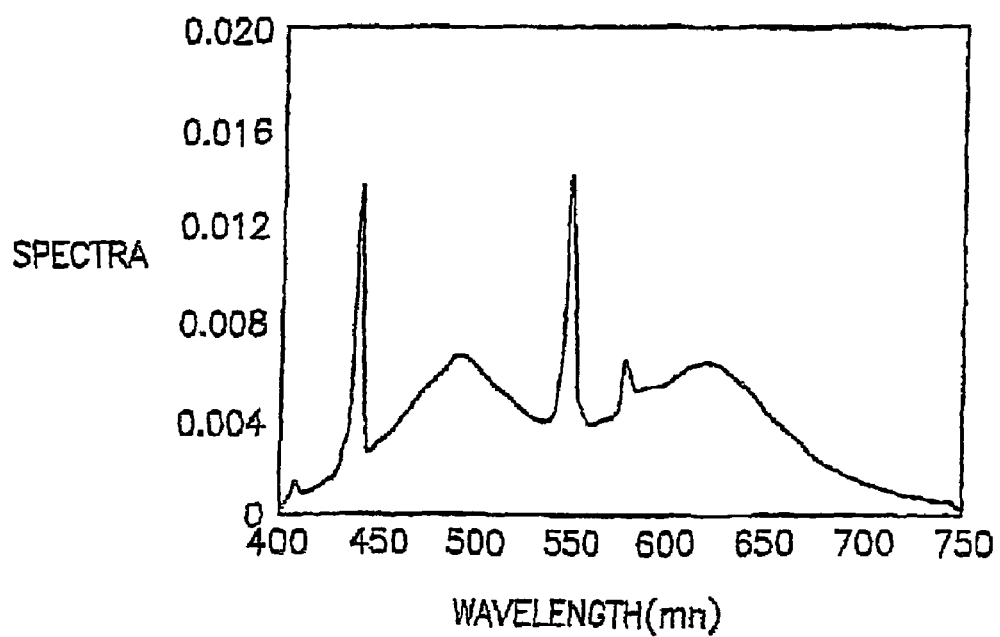
FIG. 4B a schematic illustration the spectra of a D50 equivalent fluorescent lamp.
Figure 4C:
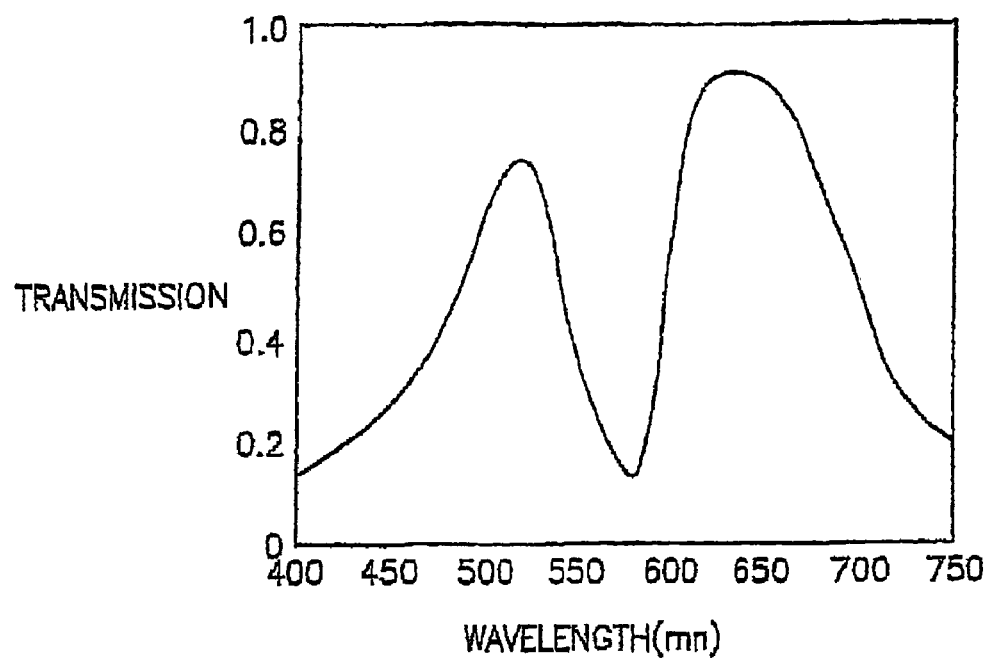
FIG. 4C is a schematic illustration of a spectrum of a correction filter according to an embodiment of the present invention.
Figure 4D:
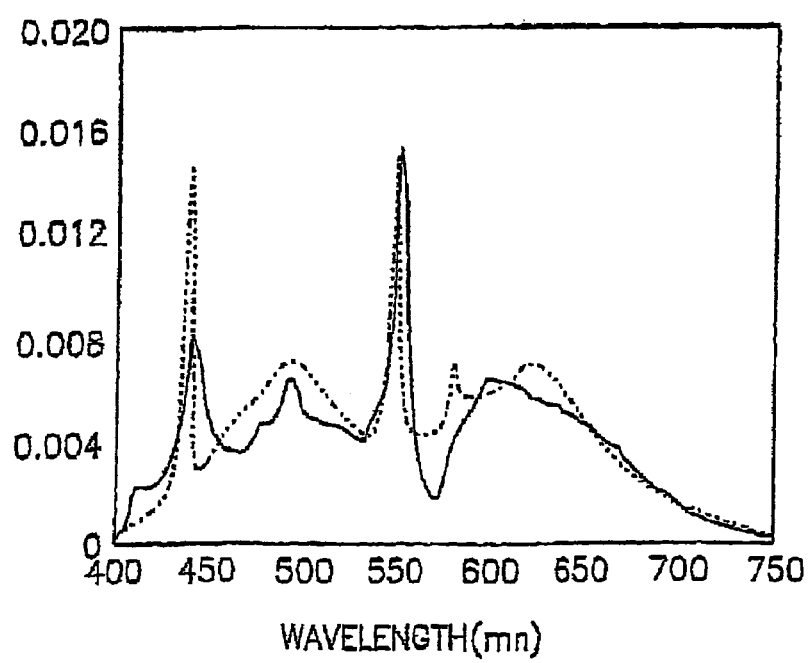
FIG. 4D is schematic illustration of a spectrum created using a correction filter according to an embodiment of the present invention.

FIGS. 4A-4D depict spectra of various white lights, a correction filter, and the spectrum resulting from the use of the correction filter, according to an embodiment of the present invention. FIG. 4A depicts the spectra of a lamp currently marketed as the Osram™ VIP lamp. FIG. 4B depicts the spectra of a D50 equivalent fluorescent lamp. A correction filter having a spectrum as shown in FIG. 4C may be applied to the spectrum of FIG. 4A to produce the spectrum of the solid line in FIG. 4D, which substantially matches the spectrum of FIG. 4B. Both spectra have substantially the same color temperature and a high color-rendering index. In alternate embodiments, other correction spectra may be applied.

Figure 6A:
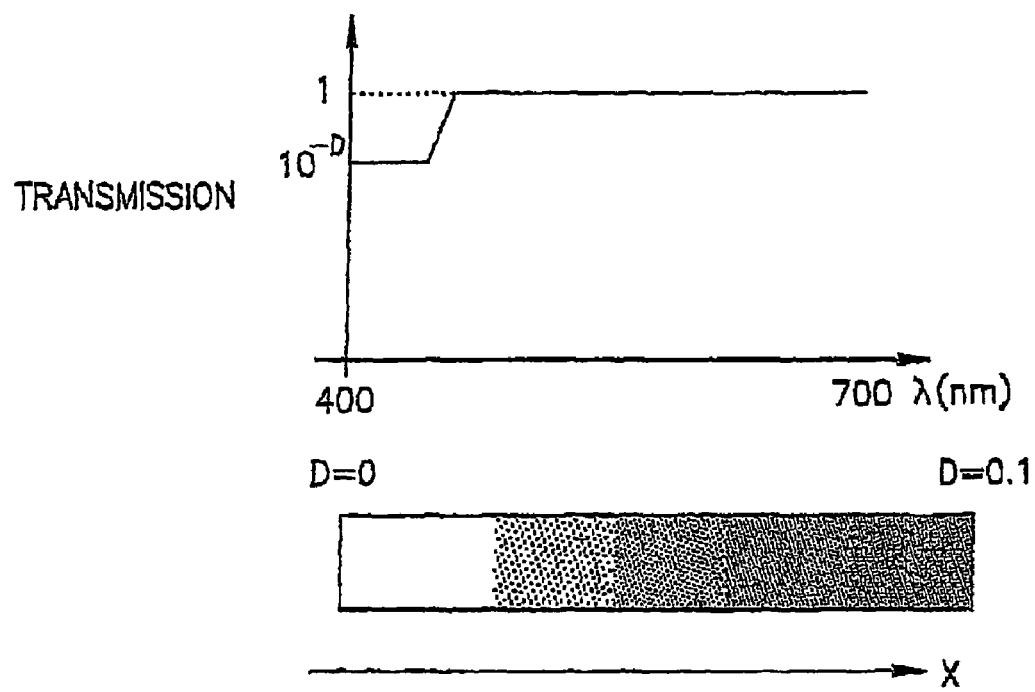
FIGS. 6A and 6B are schematic illustrations of exemplary designs of transmission spectra for a spectrum correcting filter according to embodiments of the invention.
Figure 6B:
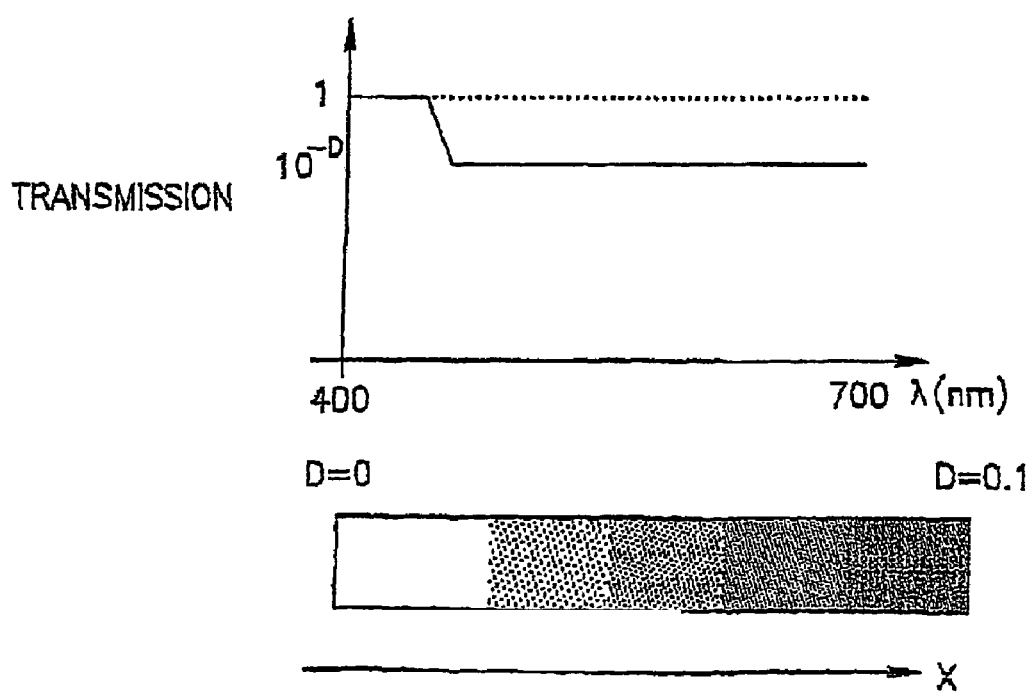

FIG. 6A schematically illustrates an exemplary spectrum for correcting filter 22 (FIG. 2B) according to one embodiment, suitable for correcting for paper reflection, and construction of a filter for such spectrum. A yellowish tint may be obtained for example, using a long-wavelength cutoff filter with density in the range of 0-0.1, as shown schematically in FIG. 6B. In embodiments of the invention, the light impinges on a relatively small area of the filter. The blue part of the spectrum may be enhanced or reduced according to the relative density in the blue part of the spectrum with respect to the rest of the spectrum at the position of incidence. The color of the transmitted light may be adjusted by shifting the placement of the filter along the x-direction, thereby changing the relative density of the filter that filters the light, until the white area on the screen has the same color as that of the paper. In further embodiments of the invention, other spectrum correcting filters and/or methods may be used. Such filters or methods may be operator-selectable or adjustable to enable correction for multiple light sources or papers.

Embodiments of the present invention may use of a modified projection display. The projection display may be equipped with specially designed color filters, as described below, a specialized viewing screen with low reflection and a wide viewing angle and, optionally, a set of illumination matching filters.

To obtain an accurate reproduction of colors, the gamut of the display in accordance with embodiments of the invention is sufficiently wide to cover, or substantially cover, the entire gamut of analog or digital hard proofing devices, such as, for example, Analog and Digital Matchprint, available from Kodak Polychrome Graphics (KPG), Analog and Digital Cromalin, available from DuPont, etc., as well as a color gamut augmented by various special colors that may be used in the printing industry. Because the colors in the display according to embodiments of the invention may be produced by filters, and not by phosphors, the gamut covered by the projection device is not limited to that commonly used in CRT monitors. Filter technologies, for example, interference filters, enable relatively straightforward realization of substantially any transmission curve desired. Therefore, complete control over the gamut coverage may be achieved, allowing for instance, spanning of the entire gamut of CMYK inks, e.g., using three, appropriately selected, primary colors. In some embodiments, filters may also be added to convert the lamp spectrum to a required or desired illumination spectrum.

Figure 5:
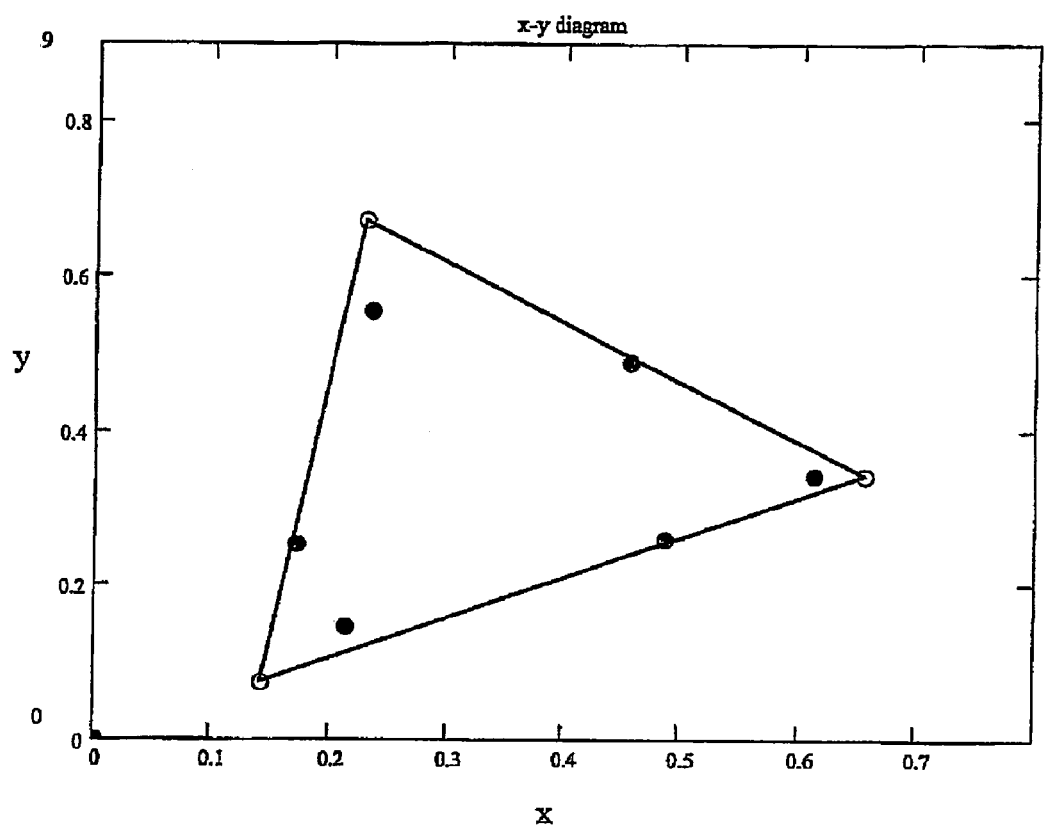
FIG. 5 is schematic illustration of a comparison, on a chromaticity diagram, between the gamut obtained by an electronic color display using filters selected in accordance with exemplary embodiments of the present invention and a typical color gamut of color printing.

As shown schematically in the chromaticity diagram of FIG. 5, in a three primaries display according to embodiments of the present invention, the color filters may be set in such a way that the triangular area defied by the display pries substantially encloses the entire hexagonal area defined by standard CMYK inks. Since there are various transmission spectra for each filter (and thus for each corresponding primary) that may match a specific point on the chromaticity diagram, other conditions may be applied to select the optimal spectrum for the given filter in accordance with the invention. For example, such a condition may be maximum brightness for a given primary at a certain chromaticity point, which indicates that the primary may be an optimal stimulus of the relevant illumination, as explained, for example, in Gunter Wyszecki and W. S. Stiles, *Color Science: Concepts and Methods, Quantitative Data and Formulae*, 2d. Ed., 1982, pp. 179-183, which is incorporated herein by reference. The filter curve may have about 100% (or close to 100%) transmission in the pass band and about 0% (or close to 0%) transmission outside the pass band, and that the cut-off points may be determined so that the chromaticity of the resulting light is obtained with maximal brightness. Another condition may be that the filters are chosen is such a way that their positive linear combinations may substantially match the spectra of the inks and their overlaps. This ensures that when colorimetric match is achieved, a spectral resemblance between the monitor and the print may also be achieved, reducing sensitivity to observer variability.

Figure 3:
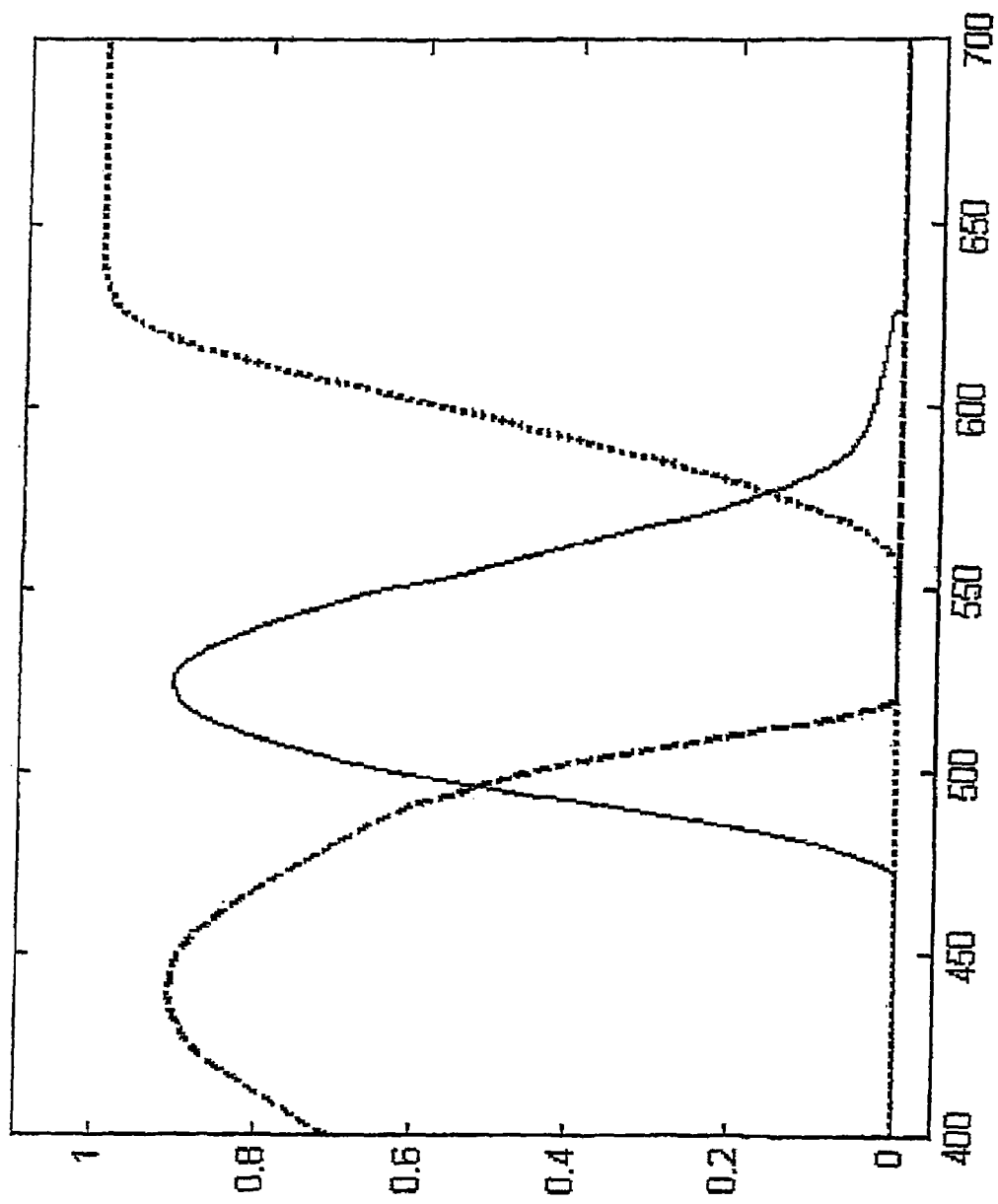
FIG. 3A is a schematic illustration of transmission spectra for a set of filters that may be used in accordance with some embodiments of the present invention.
FIG. 3B is a schematic of a comparison of a set of transmission spectra and their corresponding reproduction according to exemplary embodiments of the present invention.
Figure 3:
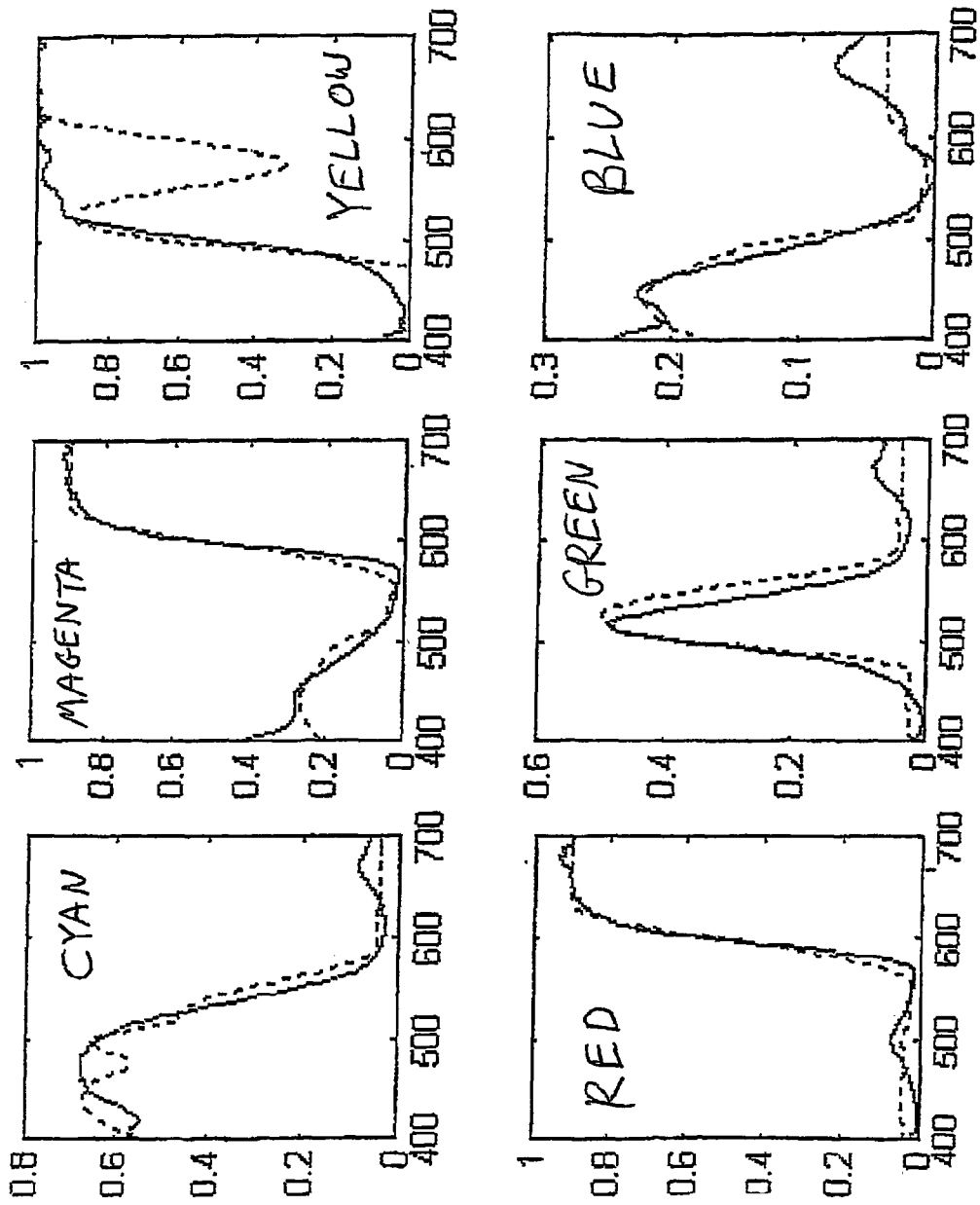

FIG. 3A schematically illustrates transmission spectra for a set of filters that may be used in accordance with some embodiments of the present invention. FIG. 3B illustrates positive (i.e., additive) linear combinations of the three filters shown in FIG. 3A, which reproduce the perceived reflection spectra of the CMY inks and their overlaps.

The use of filters selected in accordance with embodiments of the invention, for example, the transmission spectra illustrated in FIG. 3A, designed in such a way to obtain spectral resemblance, has another benefit. By adding another set of filters that converts the lamp light to standard illuminations (e.g. D50, D65, A, etc.), such that the same color temperature and a high color-rendering index is achieved, a good representation of the print under known lightning conditions is achieved. Furthermore, another set of filters that reproduces the reflection spectrum of typical substrates may also be inserted in the light path, thus allowing for simulation of various print substrates. On CRT monitors, this type of adaptations, e.g., to compensate for illumination conditions and substrate reflections, require profiling of each combination of substrate and illumination conditions. In the projection device of the present invention, in contrast, such profiling is not required because the combination of the filters selected in accordance with embodiments of the invention reproduces light that substantially mimics the transmission spectrum of the inks and the light reflected off the substrate. Thus, the filter selection in accordance with embodiments of the invention simulates the process of viewing an image printed on a substrate, and thus new colorimetric adjustment, e.g., by profiling, is unnecessary. These features of substrate simulation and illumination adaptation without profiling are major advantages of a projection based proofing device in accordance with embodiments of the invention.

Figure 7:
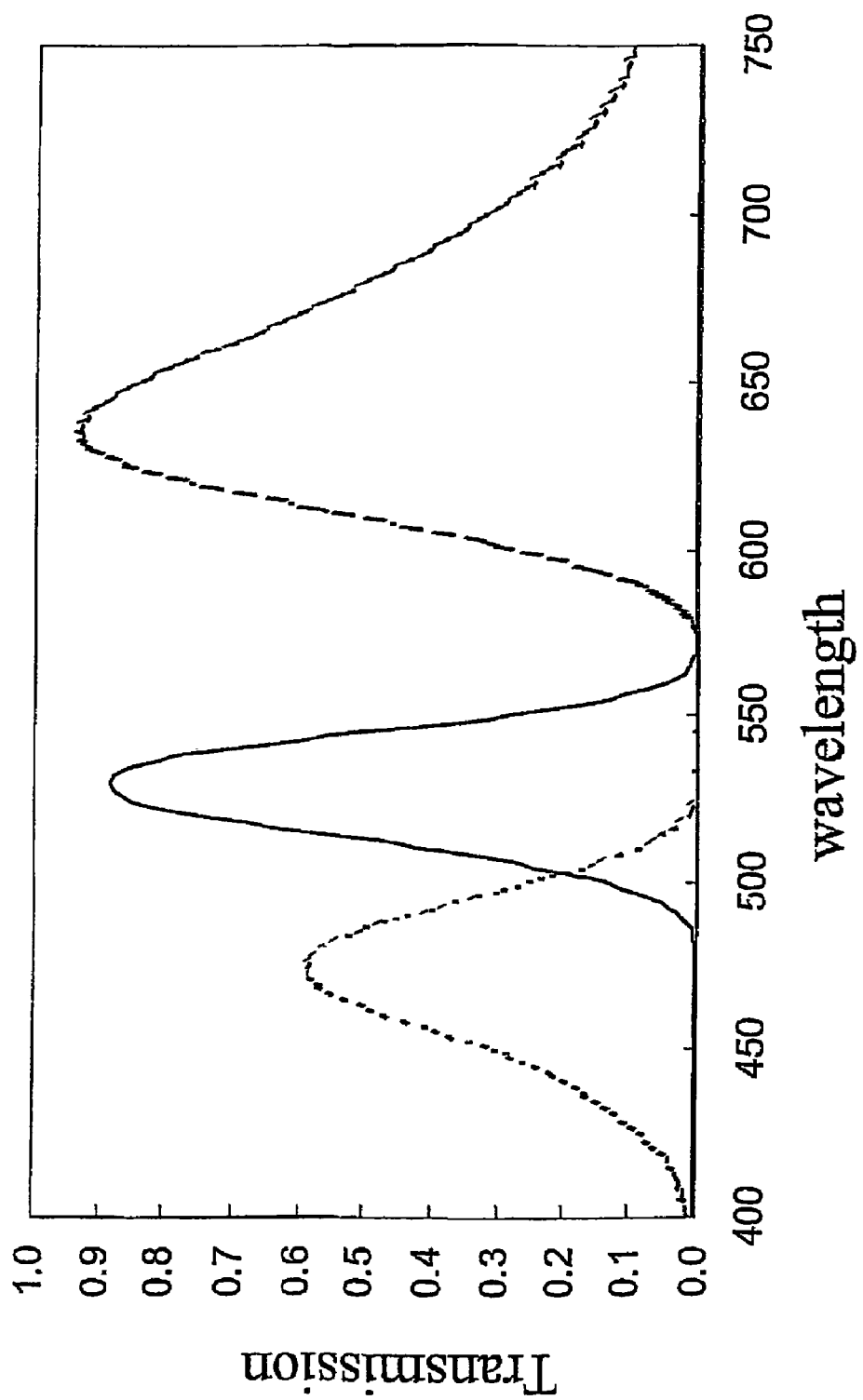
FIG. 7 is a schematic illustration of transmission spectra for a set of filters that may be used in accordance with further embodiments of the present invention.

FIG. 7 schematically illustrates transmission spectra for a set of filters that may be used in accordance with further embodiments of the present invention. In the case that proofing in accordance with the invention is performed in known illumination conditions, and for a given type of paper, the transmission spectra of the three or more color filters may also account for the paper and illumination correction filter curves. In this embodiment, the primary color filters have a dual function of creating primary colors and correcting illumination, as discussed above. In FIG. 7, the spectra of three filters that may be used in such a projection display are shown. These filters are based on the original filters designed for spectral match, e.g., the filters with transmission spectra as illustrated in FIG. 3A appropriately modified to adjust the illumination of the high pressure mercury lamp usually used in projector to that of a standard D50-like fluorescent lamp that may be used during proofing using the correction curve of FIG. 4C. This example demonstrates integration of the function of correction filters as part of the color filters. Such integration is advantageous, e.g., in reducing the number of optical surfaces, and thus reducing stray light to improve contrast. The use of integrated filters also simplifies the design of the projection display and, therefore, reduces production costs.

Special color inks, e.g., Pantons, Toyo, etc., which cannot be proofed even on prints produces by CMYK printers, and of course not on a CRT monitor, may also be covered by selecting appropriate filters in accordance with embodiments of the invention.

In some embodiments of the present invention, additional primary colors, for example, a yellow primary color, may be used to improve image reproduction. The brightness of the yellow region of the spectrum the sensitivity of the human eye peaks at yellow. Furthermore, in high-pressure Mercury lamps, which are commonly used by projection displays, most of the energy of the lamp is emitted within a few peak sub-spectra, one of which is the yellow region of the spectrum. In a three-primary system, yellow may be composed of green and red primary colors and, therefore, very bright green and red colors are required in order to achieve a sufficiently bright yellow. As illustrated in FIG. 3B, the use of three primaries does may not allow for good spectral resemblance, particularly in the yellow region. Furthermore, the "dip" in the yellow spectrum shown in FIG. 3B may reduce the intensity produced by the yellow peak of the lamp, thus reducing the device efficiency. Therefore, addition of yellow filters in accordance with some embodiments of the invention may increase the efficiency of the system considerably. Additionally or alternatively, depending on the specific filter selections, the addition of a yellow filter may further widen the gamut of the device to include more special colors, while maintaining a reasonable efficiency. For example, if yellow is included, the green and the red spectra may be further shifted toward the edge of the chromaticity diagram thus allowing for an extended gamut that may cover more special colors.

Another possibility is to include two types of blue filters. In a three-primary display the brightness of the blue filter is much higher than that of a typical blue elementary color of printed materials. Therefore, the blue light produced by a blue filter may be overly bright because its brightness may be used in reproducing white color. As a result, when presenting the blue elementary color, or similar colors, only a small portion of the light through the blue filter is required, thereby potentially limiting the useful dynamic range of the device. In order to overcome the problem, in some embodiments of the invention, two types of blue filters may be used, one which is designed to provide sufficient blue to reproduce the white, and another which has low brightness which allows to reproduce the full dynamic range of the printed blue.

Another important advantage of projection displays in accordance with embodiments of the present invention is their relative insensitivity to ambient illumination. The use of special viewing screens, for example, the Black Screen™, available from Denmark Visual Systems, CA, USA, or the DNP Black Bead Screen™, available from DNP (Dai Nippon Printing Co. Ltd.), Denmark, allows for a very low reflection of ambient illumination, which may be, e.g., one order of magnitude lower than the reflection from a conventional CRT screen. At the same time, the brightness of the projection display may be much higher than that of CRT, depending on the light source, which determines the brightness. The brightness of images produced by embodiments of the present invention may be about 4 times higher than that of prior art soft-proofing displays, resulting in a ratio between the brightness of the color created on the display and the reflected ambient light of 40:1 compared to existing soft-proofers. The flexibility to increase the brightness by choice of lamp further enables an increase of brightness and contrast thereby enabling comparison between a printed image and a displayed image at a similar level of brightness. This advantage of embodiments of the invention obviates the need for perceptual adjustments.

Projection systems in accordance with embodiments of the invention allow for stable, exchangeable, and durable color reproduction. The color is mostly controlled by the spectrum of the lamp and the color filter selections. The stability of interference filters, as described above, is very high. Furthermore, while in CRT monitors a balance must be maintained between three different electron guns at all times, requiring a sophisticated electronic circuitry and continual profiling, the balance between colors in the projection display of the invention is determined by the selected filters, assuming that the spectrum of the lamp is substantially stable throughout its useful life. Indeed during the useful life of the lamp, minor changes to its spectrum might occur, however, these changes are rather slow and therefore can be easily calibrated, as described below. Furthermore, the light source may be easily changed when exhausted, while the decay of phosphors is permanent and requires a change of the CRT itself.

Typically, the image data arrives in a CMYK format; however other data formats may be used. A display according to embodiments of the present invention may use the same data. In a three-primaries display, the transformation from CMYK to the levels/values required of the displays primaries may be performed colorimetrically in a straightforward manner. First, the color for the print primaries (the inks and the overlaps), e.g., at the corners of the hexagon in FIG. 5, under the relevant illumination, may be determined in terms of values in a tree-dimensional color space, e.g., XYZ. Then, a printer model may be used to predict the color, in XYZ coordinates, for a given CMYK combination. The resulting color is then constructed in terms of the display primaries by converting the XYZ values to corresponding values of the three primaries, e.g., using a 3×3 conversion matrix. ICC profiling, as is known in the art, may also be performed in order to improve accuracy. Alternatively, conversion from the CMYK space to the three-primary space may be performed by matching the spectrum of the ink primaries and their overlaps. However, if suitable filters are chosen in accordance with embodiments of the present invention, the correct calorimetric match is expected to also yield satisfactory spectral resemblance. In alternate embodiments, other suitable data formats and/or conversion techniques may be used.

The situation may be more complicated in the case of a display using four or more primaries. In the first steps the same process may be performed, namely, a printer model may be used to predict the color of the CMYK combination. However, the color is determined by three values (e.g., XYZ), which must be converted to four or more parameters to control the display colors. Several methods may be applied to solve this complexity. One possible solution is to pre-set the values of the display primaries that correspond to each of the inks and their overlaps. For each of the ink primaries and their overlaps (CMYRGB), a set of values is determined to define the display primaries required to reconstruct the ink primaries and their overlaps. Since there is more than one combination per each primary, optimization may be performed according to additional constrains, e.g., maximal spectral resemblance or minimum sensitivity to digitization noise. Since the values are pre-set, there is no problem running complicated algorithms to set them. When the data arrives, the CMYK values may be converted to corresponding ink and overlap coverage, based on a printer model. Then the equivalent pre-set combination of the display primaries may be used to replace each ink primary (or overlap) in an amount determined by the ink coverage. Finally, an ICC profiling may also be applied to improve accuracy. In alternate embodiments, other techniques may be used.

In practice, since the color filters, lamp and optical engine have certain spectral tolerances, an initial calibration process may be performed. This calibration enables maximum colorimetric and spectral match between the output of the monitor and any calibrated "master" monitor or printed material. As an output, the relative intensities of the primaries that contribute to each CMYRGB hexagon curve corner are determined.

During the operation period, slight changes in the spectral properties of the lamp may occur, although the changes of spectral properties of the optical elements within the operational time are typically negligible, and if such changes exist they can be compensated for by real time calibration. A detector may be used to measure the luminous intensity of the lamp light as it passes through the three or more primary filters. If there is a change in the relative intensities of the light source, colors, or primaries, e.g., the ratio of Blue divided by Green and/or Red divided by Green in a three primary system, this change may be measured and, for example, the result may be used to multiply (or divide) the relevant intensities of each primary in the calculation that determines the CMYRGB hexagon corners. It should be emphasized that, in embodiments of the present invention, there is no need to perform a calorimetric calibration, because the adjustment of the relative colorimetric intensities would generally result in excellent colorimetric accuracies for relatively large possible lamp spectral changes. Also, there is no need for high absolute detector accuracy. The only value that should preferably be very accurate is the relative detector response in the various spectral bands.

The advantages of the projection system described above are quite clear. First, it has a full coverage of the required gamut, and it may also include special colors that are outside the gamut of CMYK process inks. A change in the illumination conditions and the reflectance properties of the paper is easy to perform. The brightness level at which the comparison between print and display is performed can be adjusted to levels which are common in the industry for viewing prints. Finally, the display in accordance with embodiments of the invention is relatively insensitive to ambient light, and thus can be used practically anywhere. The data flow is typically consistent with existing workflows in the sense that the device may accept CMYK data files. In this sense, the device of the invention may be used like a printer, however, its immediate response enables interactive proofing.

The benefits described above allow the projection display of the invention to integrate smoothly into the pre-press and other publishing environments. The display may be used as a monitor for a computer, or alternatively it may be combined with a light box to create a full solution for comparing prints and proof-on-display under well defined ambient light. This is due to the insensitivity of the display to ambient light, which allows it to represent color accurately even under strong ambient illumination. The use of internal filters to adjust the light allows the display to match accurately the properties of the print under a light box illumination. It is emphasized that this type of configuration, e.g., combined display and light box, may be useful for, e.g., press applications, where the operator of the device may repeatedly and efficiently match printed sheets and proofs.

Although the present invention is described herein in the context of a sequential-projection type display device, it will be apparent to persons of ordinary skill in the art that the principles of the invention, specifically, the selection of transmission spectra as described herein, are also applicable and suitable for a simultaneous-projection type display device. For example, a projection display device in accordance with further embodiments of the invention may have three Spatial Light Modulators (SLMs) that operate simultaneously to reproduce an image, each using modulating light of one of the three primary color spectra defined above. In such devices, the light from a polychromatic light source may be separated into the desired spectra, using dichroic mirrors as are known in the art. Each of the colors may be passed through its respective SLM, which may include a transmissive liquid crystal SLM, and the modulated colored light may then be combined and projected onto a viewing screen, as is known in the art. In some embodiments, additional color filters may be used in some or all of the primary light paths, to further control the primary colors. The choice of dichroic minors and additional filters may be such that the gamut of the display will be as wide as or even wider Han that of the print to be proofed, as explained in detail above.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A projection display for reproducing a proofed image intended for printing on a substrate using a set of inks, the display comprising:
   a converter to receive said proofed image in a print color format and to convert said proofed image from said print color format to a display color format by substantially matching colors of the display color format to colors of the proofed image;
   a light source to generate and project light of a set of at least three colors having at least three different chromaticities, respectively, said chromaticities being selected to define a viewed color gamut which entirely covers a perceived color gamut of said set of inks when printed on said substrate;
   a controller to receive said proofed image in said display color format and to produce a light pattern corresponding to said proofed image by selectively controlling the path of the light of said at least three colors, and
   a correction filter, the spectrum of the correction filter being based on the spectrum of an intended light used to view the proofed image when printed on said substrate.

2. The display of claim 1, wherein the correction filter further includes a spectrum based on the spectrum reflected from a type of said substrate.

3. The display of claim 1 wherein the light source includes at least a plurality of light emitting diodes.

4. The display of claim 1, wherein the light source includes at least:
   a polychromatic source to generate polychromatic light; and
   a color filtering mechanism to sequentially generate the light of said at least three colors by filtering said polychromatic light.

5. The device of claim 4, wherein said color filtering mechanism is adapted to sequentially place at least three color filters corresponding to said at least three colors, respectively, in the path of said polychromatic light.

6. The display of claim 1, wherein said at least three colors comprise at least four colors.

7. The display of claim 1, wherein the light source produces light of three colors, the transmission spectra of which define said viewed color gamut.

8. The display of claim 1 comprising a spatial light modulator.

9. The display of claim 1 comprising a digital micro-mirror device.

10. The device of claim 1, wherein said controller controls the path of the light of said at least three colors based on image data representing the proofed image in terms of said at least three colors.

11. The device of claim 1, wherein said light source generates the light of said at least three colors independently of said proofed image.

12. The device of claim 1, wherein said light source is to generate light of exactly three colors having three different chromaticities, respectively, said chromaticities being selected to define a viewed color gamut which entirely covers a perceived color gamut of said set of inks when printed on said substrate.

13. The system of claim 1, wherein said print color format is an analog format.

14. The system of claim 13, wherein said display color format is a digital format, and wherein said converter is to convert said proofed image from said analog print color format to said digital display color format.

15. The system of claim 1, wherein said converter is to determine a combination of light of said at least three different primary colors, thereby to accurately represent the proofed image using said at least three light source colors.

16. A method for reproducing by projection a proofed image intended for printing on a substrate using a set of inks, the method comprising:
   projecting light of at least three colors having at least three different chromaticities, respectively, said chromaticities being selected to define a viewed color gamut which entirely covers a perceived color gamut of said set of inks when printed on said substrate;
   receiving said proofed image in a print color format;
   converting said proofed image from said print color format to a display color format corresponding to said at least three colors by substantially matching colors of the display color format to colors of the proofed image;
   passing light through a correction filter, the spectrum of the correction filter being based on the spectrum of an intended light source used to view said proofed image when printed on said substrate; and
   based on said converted proofed image in said display color format, selectively controlling the path of the light of said at least three colors to produce a light pattern corresponding to said proofed image.

17. The method of claim 16 wherein the spectrum of the correction filter is also based on the spectrum reflected from a type of said substrate.

18. The method of claim 16, wherein producing light of said at least three colors comprises passing light through a color wheel.

19. The method of claim 16, wherein said at least three colors include a red color, a green color and a blue color, the transmission spectra of which define said viewed color gamut.

20. The method of claim 16 comprising spatially modulating the light of said at least three colors.

21. The method of claim 16, wherein producing the light of said at least three colors comprises selectively producing the light of said at least three colors independently of said proofed image.

22. The method of claim 16, wherein producing light of at least three colors comprises producing light of exactly three colors having three different chromaticities, respectively, said chromaticities being selected to define a viewed color gamut which entirely covers a perceived color gamut of said set of inks when printed on said substrate.

23. The method of claim 16, wherein said print color format is an analog format.

24. The method of claim 16, wherein said display color format is a digital format, and wherein converting said proofed image from said print color format to a display color format comprises converting said proofed image from said analog print color format to said digital display color format.

25. The method of claim 16, further comprising determining a combination of light of said at least three different primary colors that represents the proofed image using said at least three light source colors.

* * * * *